United States Patent [19]
Yamine

[11] Patent Number: 5,732,653
[45] Date of Patent: Mar. 31, 1998

[54] MODIFICATIONS TO A PROCESS FOR FARMING CRUSTACEA

[75] Inventor: Michael Yamine, Bangkok, Thailand

[73] Assignee: Peroxythai Limited, North Klongtoey, Thailand

[21] Appl. No.: 598,679

[22] Filed: Feb. 8, 1996

[30] Foreign Application Priority Data

Feb. 9, 1995 [GB] United Kingdom ............. 9503127

[51] Int. Cl.$^6$ ................................................ A01K 61/00
[52] U.S. Cl. ............................................ 119/204; 119/207
[58] Field of Search ........................ 119/204, 207, 119/211, 231, 243, 268; 210/759, 764; 424/613; 252/186.23, 186.26, 186.42

[56] References Cited

U.S. PATENT DOCUMENTS

| | | | |
|---|---|---|---|
| 4,324,784 | 4/1982 | Naito et al. | 424/130 |
| 4,418,648 | 12/1983 | Lightner | 119/2 |
| 5,143,019 | 9/1992 | Zane | 119/2 |
| 5,324,432 | 6/1994 | Robertson et al. | 210/632 |
| 5,395,530 | 3/1995 | Robertson et al. | 210/632 |
| 5,494,588 | 2/1996 | Lazonby | 210/755 |
| 5,545,374 | 8/1996 | French et al. | 422/28 |

OTHER PUBLICATIONS

Derwent Abstract No. 95–091371 Entitled! "Preventing Hypoxia Emergeney or Hydrogen Sulphide Poisoning of Shrimps by Adding Hydrogen Peroxide Soln. to Cultivating Pool, to Increase Active Oxygen Content. Taken from CN–1079355A, (1995).

Abstract: Japanese Unexamined Specification No. 03/147727, Shimada et al. (1991).

Abstract: Japanese Unexamined Specification No. 06/227907, Nichimo (1994).

*Primary Examiner*—Joseph D. Anthony
*Attorney, Agent, or Firm*—Larson & Taylor

[57] ABSTRACT

Crustacea, and especially shrimps are farmed in ponds, which can become contaminated with pathogenic bacteria, and in which predatory fish can consume a significant proportion of the shrimps if not controlled. The ponds desirably should contain a controlled level of phytoplankton. Such ponds can be treated with dilute peracid such as peracetic acid at a concentration that is significantly below the concentration which is lethal to the shrimps in order to control phytoplankton and/or pathogenic bacteria and to kill the fish. The peracid is preferably selected in the range of from about 0.5 to about 5 mg/l peracetic acid.

12 Claims, No Drawings

MODIFICATIONS TO A PROCESS FOR FARMING CRUSTACEA

This invention relates to improvements or modifications to a process for farming crustacea and particularly for farming shrimps.

A continuing demand for crustacea, including particularly shrimps, has resulted in a well-established industry for farming them under controlled conditions. Although the industry is of especial significance in Thailand, it is also extensively found elsewhere in Asia, both on the mainland and in offshore islands, as well as in the Americas and Australasia.

In view of the scale of production, shrimps are usually farmed in open-air ponds of the appropriate water for the species of shrimp being reared. In many instances, saline water is employed. Shrimp larvae from hatcheries are transferred into and cultivated in the ponds until they attain the desired weight whereupon they are harvested. Shrimps can grow quickly in their culture ponds if fed and tended carefully, but their growth can be checked by adverse conditions such as disease or predators. By way of example, it is desirable to retain a bloom of phytoplankton in the ponds, not only to provide a supplement in the shrimp diet to the nutrients commonly added, but additionally as a means to shield the shrimps and especially young shrimps from the strength of the noonday sun. The green phytoplankton are beneficial. However, if the plankton proliferate too quickly, there is an observed tendency for them to be replaced to an increasing extent by a brown, detrimental species. Accordingly, it has been recognised that it is desirable to control the growth of the phytoplankton, such as by choice of a suitable chemical treatment, but at such an extent that the phytoplankton is neither eradicated nor permitted to proliferate too quickly.

Even if the phytoplankton proliferation is controlled appropriately, the shrimps can still be affected adversely by pathogenic microorganisms, including pathogenic bacteria, such as strains of Vibrio bacteria and others, which can lead to a high morbidity and ultimately a high mortality. Neither outcome is welcomed by a shrimp farmer seeking a high conversion of nutrient feed and shrimp larvae into harvestable product. Accordingly, it has been further recognised that it is inherently desirable to prevent such pathogenic microorganisms from proliferating, for example by choice of a suitable chemical treatment.

There is one further hazard that a shrimp faces. It occupies an intermediate position in the food chain, representing a tasty morsel for fish, including tilapia and like sized fish which can tolerate life in the shrimp ponds. Removal of live predatory fish increases the life expectancy of the shrimps and hence the weight yield of shrimps from a batch of larvae. One control means could comprise a chemical treatment that is at a high enough concentration to kill the fish.

There is one over-riding constraint upon any chemical treatment which a farmer might seek to employ during the growth phase of the shrimps to counteract one or more of the three hazards identified above. Shrimps are living creatures too. Although the treatment needs to be sufficiently active to attain the desired effect, it must be sufficiently inactive against shrimps to enable them to survive.

It is possible to contemplate using a chlorine-containing disinfectant such as hypochlorite to carry out one or more of the chemical treatments identified above, but consumers have shown increasing resistance towards products that have been subjected to chlorinaceous treatments, and legislators continue to introduce constraints upon such treatments, so that it is becoming increasingly desirable to devise and employ alternative treatments.

Peroxygen compounds such as hydrogen peroxide or peroxyacids have been employed as biocides or biostats. In particular, peroxygen compounds have been suggested by Nippon Peroxide in Japanese Kokai 03/147727 as a treatment for the sand at the bottom of fish or shell-fish culture ponds at a concentration of 0.1 to 6% by weight. The peroxygen compounds contemplated therein included acidic potassium persulphate, peracetic acid, perbenzoic acid and magnesium monoperoxyphthalate amongst others. Although such a treatment might be effective for treating ponds before they have been brought into use or whilst they are being cleaned out after one batch of shrimps have been reared, and before the next is introduced, such treatments with peracids are inappropriate for ponds containing live crustacea such as shrimps, because it would kill them.

It is an object of certain aspects of the present invention to provide a process for treatment of ponds with a peroxygen compound during the rearing of crustacea which avoids or ameliorates one or more of the hazards identified above whilst simultaneously enabling the crustacea to survive.

It is a second object of some or further aspects of the present invention to provide a process for the treatment of ponds with a peracid during the rearing of crustacea which simultaneously controls the growth of phytoplankton and enables the crustacea to survive.

It is a third object of some or yet other aspects of the present invention to provide a process for the treatment of ponds with a peracid during the rearing of crustacea which simultaneously inhibits or controls the growth of pathogenic microorganisms, including bacteria, and enables the crustacea to survive.

Still other objects of the present invention may be ascertained by a reading of the detailed description herein.

According to the present invention, there is provided a process for the treatment of a pond containing live crustacea in which a peracid is introduced into the pond to provide a peracid concentration which is sub-lethal to the crustacea.

By the choice of a peracid concentration suitably within the range that is sub-lethal to the crustacea, it is possible to select a concentration which effects one or more of controlling the proliferation of phytoplankton, inhibiting or controlling the growth of pathogenic microorganisms and mortally controlling piscine predators (small fish). Expressed in general terms, a peracid solution is sub-lethal to crustacea at a very low concentration. The upper limit for a sub-lethal concentration can be determined by contacting the crustacea at an increasing peracid concentration under the prevailing conditions until half of them are seen to die in the trial period, normally 24 hours.

In a number of advantageous embodiments of the present invention, it is desirable to select a peracid concentration of from 0.5 mg/l up to 50% by weight of the $LC_{50}$ (24 hours) concentration for the crustacean being reared. In certain preferred embodiments, the peracid concentration in the pond is in the range of up to about 5 mg/l, such as 0.5 to 5 mg/l. In various effective treatments, the concentration of peracid is up to 3 mg/l peracid, and in some instances from about 1 to about 2 mg/l peracid, calculated at the molar equivalent weight of peracetic acid. By choosing peracid and especially peracetic acid in concentrations of for example up to about 3 mg/l and especially 1–2 mg/l, the bloom of phytoplankton can be controlled so as to maintain a bloom that neither proliferates excessively nor is killed completely.

By choice of peracid concentration within the range of 0.5 to 5 mg/l, the pathogenic bacteria can be controlled, the extent and rate at which the total bacteria count is lowered or prevented from proliferating being dependent on the actual concentration. A shock dose treatment for pathogens at a slightly higher concentration, but still sub-lethal to crustacea, such as 8–10 mg/l can be contemplated, preferably in the presence of older rather than younger shrimps.

By choice of peracid concentration within the range of 0.5 to 5 mg/l, a piscine lethal dose can be administered which is still sub-lethal to the crustacea.

The peracid employed is desirably selected from low molecular weight aliphatic peracids, which typically contain up to 6 carbons. Preferred peracids comprise C2–C4 peracids, or which peracetic acid (C2) is especially convenient in view of its efficacy and ready availability. Alternative peracids which can be contemplated include monoperphthalic acid, which is most conveniently and safely supplied as its monomagnesium salt.

The composition supplying the low molecular weight aliphatic acid such as peracetic acid or like peracid is at the discretion of the user. It can be employed in the form of distilled compositions, if desired. However, the step of distillation can render the peracid more expensive, and most conveniently, the peracid can be employed in the form of an aqueous composition typically prepared by reacting aqueous hydrogen peroxide and the corresponding carboxylic acid or anhydride and containing residual concentrations of hydrogen peroxide and the carboxylic acid. In such aqueous compositions, described herein particularly with respect to peracetic acid, the concentration of peracetic acid is often in the range of from 1 to 45% by weight and in many instances from about 5 to about 20% by weight. The concentration of residual acetic acid is often selected in the range of from about 2 to 45% by weight, and in many instances from about 5 to about 30% by weight. Likewise, the concentration of hydrogen peroxide in such compositions is selected in the range of about 2 to 35% and in many instances from about 5 to about 25% by weight.

In a number of especially convenient compositions, the peracetic acid concentration is selected in the range of 10 to 17% w/w, the acetic acid selected from 15 to 30% w/w and the hydrogen peroxide selected from 12 to 20% w/w. In many instances the concentrations are such that the composition is in equilibrium, though it can also be convenient for an excess of one or both of the carboxylic acid and/or hydrogen peroxide to be present to enable a slow generation of peracid to occur during storage. In some practical compositions, the peracetic acid solution on introduction into the shrimp pond contains residual hydrogen peroxide and residual acetic acid in a weight ratio to the peracetic acid of respectively from about 0.5:1 to about 2:1 and 0.7:1 to 2.5:1.

The peracetic acid compositions can include a number of additional constituents, if desired, such as stabiliser, including phosphonic acids, eg hydroxyethylidenediphosphonic acid, and/or dipicolinic acid, and acid catalyst eg sulphuric acid. The amount of stabiliser is often up to about 2% of the composition and the amount of catalyst, if present other than from the stabiliser, is often from 0 to 1% w/w of the composition. It is advantageous to employ a surfactant-free peracid composition to minimise foaming.

Although the present invention has been described as the treatment of ponds containing the crustacea, it will be understood that ponds herein is employed as a generic term that embraces pools excavated in the earth or built up with earthen walls or in man-made enclosures such as tanks.

The manner of introduction of the peracid composition into the water in the pond is at the discretion of the user. Although the peracid composition can be introduced without dilution, it is also possible to pre-dilute the composition, for example by a factor of from 2 to 100, in order to reduce or eliminate the effects of any localised high concentrations at or near the point of introduction of the composition. One convenient method of introduction comprises pouring the peracid composition onto the surface of the pond in the vicinity of surface aerators that are normally employed in the ponds or pumping the composition through an outlet or outlets similarly located. Even distribution of the peracid through-out the pond water can be assisted by multiple points of introduction, which is naturally of greater advantage in larger ponds.

Treatment of the pond with the peracid is usually carried out on a plurality of occasions, at intervals during the rearing of the shrimps, which is often a period of from about 3 to about 6 months, depending on the species of shrimp being cultivated. During the early stages, the treatment is usually carried out relatively infrequently, such as at an interval of between 1 and 2 weeks and during the later stages the treatments are carried out more frequently. In such latter stages, a daily peracid treatment can be contemplated, but in practice an interval of 3 or 4 days is often acceptable. Such a treatment regime is, at least in part, prophylactic. It will be recognised that if disease is observed in the shrimps, the next treatment can be brought forward and if considered advantageous, a higher than normal concentration can be employed, though still one that is within the range contemplated for the instant invention.

Although the term shrimp is employed herein, it will understood that an alternative that can be employed for related species comprises prawns and the present invention is similarly contemplated for the treatment of ponds containing prawns. The present invention contemplates, in particular the treatment of ponds containing tropical and sub-tropical species of shrimps and prawns, of which most are reared in saline conditions. The shrimp or prawn to cultivate is often a local species, since it is adapted and well suited to prevailing local conditions. Amongst the more important species commercially of penaeid shrimps in Asia is the tiger shrimp, (*P. monodon*) and others of importance include the white or Indian shrimp (*P. indicus*) the banana shrimp (*P. merguiensis*) the green tiger or bear shrimp (*P. semilcatus*) the oriental shrimp (*P. orientalis* or *chinensis*) and the red-tailed shrimp (*P. penicillatus*). Other shrimps which can be contemplated for treatment during their rearing by a process according to the present invention comprise *P. japonicus, P. kerathurus, P. notialis, P. vannamei* and *P. stylirostris*.

Herein, the rearing conditions for penaeid shrimps often include use of saline water in the pond containing NaCl at a concentration of from about 10 to 30 g/l and at ambient temperature, which under tropical conditions is often in the region of about 28° to 35° C. for a significant fraction of the time. The water employed often has a pH of from about 6.5 to 7.5 or is adjusted to within that range, for example by liming. Typically, the ponds employ aeration and the shrimps are fed regularly as in the currently adopted rearing where alternative disease control agents have been employed.

In at least certain aspects of the present invention, the concentration of peracetic acid in the pond is selected in order to control the growth of but not eliminate phytoplankton in the pond water, and particularly blue green algae (*Chroococcus sp*) and diatoms (*Chaetoceros sp*). In other or overlapping aspects of the present invention, the concentration of peracetic acid in the pond water is controlled to prevent the proliferation of or eliminate viable pathogens, including pathogenic bacteria such as strains of Vibrio, Aeromonas, Diplococcus and Serratia, such as *Vibrio harveyi, Vibrio parahaemolyticus, Vibrio vulnificus, Vibrio damsela, Vibrio chloerae, Aeromonas hydrophila, Pseudomonas sp, Diplococcus sp,* and *Serratia sp,* which infect shrimps and other fauna that inhabit such tropical ponds.

Advantageously, the process of the present invention can be combined with a pre-treatment of the pond water with the same or another peracid from the class of peracids identified above, and especially peracetic acid, before the shrimps are introduced into the pond and/or before the water is introduced into the pond. In such pre-treatments, there is no need to be limited by the constraints on peracid concentration that apply when crustacea are present, provided that the peracid concentration has fallen or been reduced to a shrimp-tolerable level when the solution encounters the crustacea. Thus, for example, in such pre-treatments, the concentration of peracid can be dictated by the prevailing considerations of contact time and pathogen to be controlled, for example from 5 to 250 mg/l peracid. The choice of peracid for both pre-treatment and treatment during rearing, enables the user to minimise the number of treatment chemicals to employ and to minimise any mutually destructive interaction between the residual concentration of an earlier treatment chemical with the chemical introduced in the rearing process, as for example would be the case for hypochlorite followed by peracid.

Having described the invention in general terms, specific embodiments of aspects thereof are described in greater detail by way of demonstration only.

EXAMPLE 1

Demonstration of the toxicity of peracetic acid on shrimps and fish

In this demonstration, the 24 hour $LC_{50}$ for shrimps (*P. monodon*) was determined in cylindrical glass tanks containing 2 liters of sea water (30 ppt) which had been aerated for a day before the trial commenced and 10 shrimps. The concentration of peracetic acid was increased until only 50% survived 24 hours in ambient conditions. A single dose of peracetic acid was employed at the start of each test, with residual hydrogen peroxide and acetic acid at weight ratio respectively to the peracetic acid of 1:1 and 2:1, and no aeration was made during the test. Repeat tests were carried out on shrimps of both post larva 10 days and post larva 15 days with similar results, the 24 hr $LC_{50}$ for each being reached, on average, at approximately 36 mg/l peracetic acid, with the minimum observed result being observed at about 28/29 mg/l.

Similar tests were carried out under similar conditions to determine the 24 hour $LC_{50}$ of peracetic acid concentration for a representative brackish water fish Tilapia Mosambica, a fish which can survive and grow in shrimp water ponds. The fish which were approximately 1.5 to 2.5 cms long. The 24 hour $LC_{50}$ for the fish was reached at between 2–3 mg/l peracetic acid.

From a comparison of the 24 hour $LC_{50}$ for the shrimps and fish, it can be seen that a peracetic acid dose can be selected that kills the fish whilst permitting the shrimps to survive.

EXAMPLE 2

Determination of viable concentration of peracetic acid for control of phytoplankton and bacteria flora.

In this determination, the effect of peracetic acid on phytoplankton was measured. Trials were conducted in which a fibre glass tank was filled with sea water (30 ppt, 150 liters) taken from a pond in which shrimps (*P monodon*) were being reared and was fully aerated. The tanks each contained bacteria flora and two species of phtyoplankton, blue green algae (CC -*chroococcus sp*) and diatoms (CH -*chaetoceros sp*) at the initial cell density given in Table 1 below, expressed as numbers of plankton cells×$10^5$ per ml. The total bacteria count was determined by a conventional agar plate technique, and the results summarised in Table 2 below, and the change in count expressed as its log reduction factor (LRF). No peracetic acid was employed in the Control. In trial 1, peracetic acid was dosed into the tank to provide a concentration of 1 mg/l, together with a concentration of hydrogen peroxide of approximately 1 mg/l and a concentration of acetic acid of approximately 2 mg/l. In trial 2, the concentration of peracetic acid dosed into the tank was 2 mg/l and the corresponding concentrations of hydrogen peroxide and acetic acid were respectively 2 and 4 mg/l. Each trial was conducted in duplicate tanks and the result given is an average. The numbers of plankton were measured in succeeding days and the results after 1 and 7 days are shown.

TABLE 1

| | Plankton Count × $10^5$ | | | | | |
|---|---|---|---|---|---|---|
| | Before peracid | | After 1 Day | | After 7 days | |
| Trial No | CC | CH | CC | CH | CC | CH |
| Control | 2.2 | 2.2 | 5.2 | 7.9 | 10.2 | 30.0 |
| 1 | 2.8 | 2.3 | 1.9 | 5.6 | 4.7 | 26.5 |
| 2 | 2.8 | 2.2 | 2.8 | 1.7 | 7.8 | 4.0 |

TABLE 2

| Trial No | Total Bacteria Count Before Peracid | LRF After 6 hours | LRF After 7 days |
|---|---|---|---|
| Control | 2.1 × $10^5$ | 0 | 2.2 |
| 1 | 3.3 × $10^5$ | 1 | 3.3 |
| 2 | 2.9 × $10^5$ | 2.1 | 3.2 |

From Table 1, it can be seen that the employment of peracetic acid at the selected concentrations enabled the phtyoplankton growth to be controlled whilst enabling a resident population to remain viable. From Table 2, it can be seen that peracetic acid at concentrations of only 1 or 2 mg/l caused a faster and greater reduction in bacteria numbers than is evident from the control. By comparing the data in Tables 1 and 2 with the previously determined the 24 hour $LC_{50}$ for shrimps, it can be seen that the concentration of peracetic acid that is suitable for the control of phytoplankton and prevention of bacteria proliferation is substantially lower than the concentration at which it would cause significant shrimp mortalities.

EXAMPLE 3

Demonstration of control of pathogenic bacteria

In these trials, a series of tests were carried out by employing peracetic acid in a saline (30 ppt) suspension of pathogenic bacteria identified in Table 3, that had been isolated from fauna in shrimp ponds, in order to determine the minimum concentration of agent that prevented growth of the bacterium. The tests were conducted using a variation of the standard evaluation method described by the National Committee for Clinical Laboratory Standard (NCCLS)

USA. The tests were carried out by mixing a suspension of the selected bacterium in sea water with a daily made diluted stock solution of peracetic acid to provide tubes of test solutions, each containing approximately $10^5$ CFU/ml and a range of concentrations of peracetic acid, the lowest being 0.25 mg/l, and successively higher ones at doubled concentrations. The solutions contained hydrogen peroxide and acetic acid at a weight ratio to the peracetic acid of respectively 1:1 and 2:1. The tubes were incubated for 24 hours at 28° C. and the liquid streaked onto agar plates and incubated overnight to show bacterial growth. The lowest concentration (MBC) of peracetic acid is recorded in Table 3 at which no growth of bacteria was observed.

TABLE 3

| Bacterial Strain | MBC of peracetic acid (mg/l) |
| --- | --- |
| Vibrio harveyi | 1.5 to 8 |
| Vibrio parahaemolyticus | 1.5 to 3 |
| Vibrio vunificus | 2 |
| Vibrio alginolyticus | 1.5 |
| Vibrio damsela | 1 |
| Vibrio cholera | 6 |
| Aeromonas sorbria | 1 |
| Pseudomonas sp | 8 |
| Diplococcus sp | 2 |
| Serralia sp | 6 |
| Shrimp pond water | 4 |

From Table 3, it can be seen that the peracetic acid concentration was effective at controlling the pathogenic bacteria at a low concentration.

The data above confirms that a concentration of peracetic acid can be selected which ensures that the shrimps remain healthy whilst controlling both phytoplankton and pathogen bacteria and killing Tilapia fish.

EXAMPLE 4

Control of Bacteria in Shrimp Ponds 2 shrimp ponds were treated with peracetic acid, the first with a peracid concentration of 1 ppm, the second with a concentration of 5 ppm. The peracid solution employed was an equilibrium product comprising 12% w/w peracetic acid, 19% w/w hydrogen peroxide and 20% w/w acetic acid. A third pond was employed as an untreated control. Each pond had an average depth of 1.4 m. The water employed to fill the ponds was stored in a reservoir for 2 weeks prior to adding to the ponds, and had a salinity of 33 ppt. The water in each of the ponds was aerated for 24 hours before the start of the trial. The total concentration of bacteria in each of the ponds, including the control, was measured immediately prior to the addition of the peracid and again 6 hours after the addition of the peracid. The peracid was rapidly distributed around the ponds to ensure an even treatment. The total bacterial counts, in cfu/ml are given in Table 4 below.

TABLE 4

| | Total bacterial count at time | |
| --- | --- | --- |
| Treatment employed | Initial | 6 hours |
| Control | 8950 | 4925 |
| 1 ppm peracetic acid | 7250 | 500 |
| 5 ppm peracetic acid | 9700 | 40 |

The results in Table 4 showed that both 1 ppm and 5 ppm peracetic acid treatments gave rapid reductions in the bacterial numbers in shrimp pond water compared with the control.

EXAMPLE 5

2 shrimp ponds, ponds 1 and 2, were treated with 1 ppm peracetic acid. The peracid solution employed was an equilibrium product comprising 12% w/w peracetic acid, 19% w/w hydrogen peroxide and 20% w/w acetic acid. A third pond, pond 3, was employed as an untreated control. Each pond had an average depth of 1.4 m, the pond water having a salinity of 20 ppt. Each of the ponds had been stocked with shrimps 4 weeks before the start of the trial. The total concentration of bacteria, and also the concentration of Vibrio bacteria in each of the ponds, including the control, was measured immediately prior to the addition of the peracid and again 6 hours after the addition of the peracid. The peracid was rapidly distributed around the ponds to ensure an even treatment. The total bacterial and Vibrio counts, in cfu/ml are given in Table 5 below.

TABLE 5

| | Total bacterial count | | Vibrio bacterial count | |
| --- | --- | --- | --- | --- |
| Pond treated | Initial | 6 hours | Initial | 6 hours |
| 1 | 4230 | 2110 | 307 | 138 |
| 2 | 3540 | 1360 | 275 | 106 |
| 3 (control) | 3220 | 3690 | 505 | 798 |

The results in Table 5 showed that the use of a 1 ppm treatment gave significant reductions in both the total bacterial count and in the Vibrio count of a stocked shrimp pond, compared with the control.

I claim:

1. A process for the treatment of a pond containing live crustacea and green phytoplankton in which a peracid is introduced into the pond to provide a peracid concentration which is not more than the $LC_{50}$ (24 hour) concentration for the crustacea and which maintains a population of the green phytoplankton but prevents proliferation thereof.

2. A process according to claim 1 in which the peracid concentration is not more than 50% by weight of the $LC_{50}$ (24 hours) concentration for said crustacean.

3. A process according to claim 1 wherein the peracid comprises peracetic acid.

4. A process according to claim 1, wherein the pond contains sea water and the crustacean comprises a sea water shrimp.

5. A process according to claim 4 in which the shrimp is P. monodon.

6. A process according to claim 1 wherein the treatment of the pond with peracid is carried out at an interval selected in the range of from 1 to 10 days between treatments.

7. A process according to claim 6 in which the interval between treatments decreases from about 7 to 10 days when the crustacea are young to about 1 to 5 days when the crustacea are nearly ready to harvest.

8. A process according to claim 1 wherein the crustacea comprise shrimps.

9. A process according to claim 8 wherein the pond contains fish in addition to shrimps and the peracid concentration is lethal for the fish.

10. A process according to claim 8 wherein the pond contains pathogenic bacteria in addition to shrimps and the peracid concentration prevents proliferation of the bacteria.

11. A process according to claim 1 or 8 in which the concentration of peracid in the pond is not more than 5 mg/l.

12. A process according to claim 1 or 8 wherein the concentration of peracid in the pond is from about 0.5 to about 2 mg/l.

* * * * *